United States Patent
Onley et al.

(10) Patent No.: US 9,956,628 B2
(45) Date of Patent: May 1, 2018

(54) METHOD OF PRODUCING A ROTATIONALLY ORIENTED THREAD

(71) Applicant: JAGUAR LAND ROVER LIMITED, Warwickshire (GB)

(72) Inventors: Ben Onley, Coventry (GB); Stephen Yeoman, Coventry (GB)

(73) Assignee: JAGUAR LAND ROVER LIMITED, Whitley, Coventry (GB)

(*) Notice: Subject to any disclaimer, the term of this patent is extended or adjusted under 35 U.S.C. 154(b) by 183 days.

(21) Appl. No.: 15/038,048

(22) PCT Filed: Nov. 20, 2014

(86) PCT No.: PCT/EP2014/075094
§ 371 (c)(1),
(2) Date: May 20, 2016

(87) PCT Pub. No.: WO2015/075109
PCT Pub. Date: May 28, 2015

(65) Prior Publication Data
US 2016/0303672 A1  Oct. 20, 2016

(30) Foreign Application Priority Data
Nov. 22, 2013 (GB) .................... 1320640.4

(51) Int. Cl.
*B23G 3/04* (2006.01)
*B23G 7/00* (2006.01)
(Continued)

(52) U.S. Cl.
CPC ............. *B23G 3/04* (2013.01); *B23G 1/16* (2013.01); *B23G 7/00* (2013.01); *H01T 13/08* (2013.01); *B23G 2240/56* (2013.01)

(58) Field of Classification Search
CPC ... B23G 3/04; B23G 1/16; B23G 7/00; B23G 2240/56; H01T 13/08
See application file for complete search history.

(56) References Cited

U.S. PATENT DOCUMENTS

2010/0092255 A1   4/2010  Owusu et al.

FOREIGN PATENT DOCUMENTS

| JP | 2012240179 A | 12/2012 |
|---|---|---|
| JP | 2012243697 A | 12/2012 |
| WO | 2009140150 A2 | 11/2009 |

OTHER PUBLICATIONS

International Search Report and Written Opinion of the International Searching Authority for International application No. PCT/EP2014/075094 dated Jun. 3, 2015.
(Continued)

*Primary Examiner* — Moshe Wilensky
(74) *Attorney, Agent, or Firm* — Carlson, Gaskey & Olds, P.C.

(57) ABSTRACT

A method of producing a rotationally orientated thread starting at a desired angular position and suitable for mass production is provided. The method is particularly suitable for improving the angular positioning of spark plugs in car engines. The method involves measuring precisely the length (L) of the tool (13) and the distance, at a particular angular position, of a full thread form (14) of the thread to the tip, so that its start position at the tip can be calculated. Using that distance as an offset of the length of the tool reported to the CNC machine, and starting from its reference position, it commences producing the thread (12) in the bore (11) at the desired angular position of the bore (11).

19 Claims, 5 Drawing Sheets

(51) Int. Cl.
*H01T 13/08* (2006.01)
*B23G 1/16* (2006.01)

(56) References Cited

OTHER PUBLICATIONS

Combined Search and Examination Report under Sections 17 and 18(3) for Application No. GB1320640.4 dated Apr. 17, 2014.

METHOD OF PRODUCING A ROTATIONALLY ORIENTED THREAD

TECHNICAL FIELD

This invention relates to a method of forming a rotationally oriented thread and particularly, but not exclusively, a thread in an engine cylinder head to receive a spark plug. Aspects of the invention relate to a method of producing a thread on a thread on a workpiece, a method of arranging the position of a spark plug at a predetermined angular position in the cylinder head of an internal combustion engine, a method of manufacture of an engine, a method of manufacture of a vehicle, an engine and a programme for a CNC machining centre.

BACKGROUND

It is known to be desirable at times to be able to machine a thread, either internal or external, with a reliably oriented start position, or rather, with a reliably oriented finish position, so that when two components are screwed together to a desired torque, one has a predetermined orientation with respect to the other.

The predetermined orientation may permit functionality of one or both of the components. In internal combustion engines for motor vehicles, for example, a spark plug is screwed into a bore associated with a cylinder in the engine so that the spark plug may ignite fuel injected into the cylinder. Spark plugs are well known and usually comprise a central live electrode mounted in an insulating ceramic body surrounding the live electrode and which itself is mounted within an annular ground electrode. The annular ground electrode is completed by an arm from the edge of the annular part that overhangs the central electrode to form a predetermined air gap between the ground electrode and the live electrode. A spark forms across the spark plug gap when a potential difference is applied to the electrodes.

Modern engines have fuel injectors that inject fuel at the last possible moment before ignition. The injected fuel may be arranged in directed sprays or jets that pass close to the spark plug gap. However, such sprays must not be allowed to spray between the gap or else they can disrupt the development of the spark. If this were to happen, the spark would not be as hot as intended and this would lead to inefficient and or incomplete burning of the fuel. This would most likely mean that the engine would fail to meet emissions targets. The annular ground electrode is provided with a thread to enable the plug to be screwed into a corresponding thread in the engine cylinder head. The cylinder head has a spot face, being the flange of the cylinder head surrounding the threaded bore that receives the sparkplug and against which spot face a seal washer on the sparkplug seats after tightening to a predetermined torque.

When a spark plug is screwed into a cylinder head, it has hitherto been the case that the rotational position of the ground electrode arm is entirely arbitrary. This is not satisfactory in modern engines where the spray of fuel from the injectors is both late, coinciding with the development of the spark, and close to the spark plug electrodes. If the spray should hit the arm, the spray may be deflected between the electrodes and/or displace gas between the electrodes which is ionised as a precursor for the electric arc that follows shortly and provides the requisite heat to ignite the fuel. Ideally, the spark plug arm should connect with the edge of the annular electrode diametrically opposite to opening of the fuel injectors or at most be within ±45° of that position, so that there is no opportunity for the arm to disrupt the spray from the injectors. Indeed, an alternative position directly opposite would also be perfectly acceptable, but the permitted error in the angular position before spray disruption was possible would be much less. Spray disruption also leads to potential wetting of the spark plug electrode that results in carbon deposits after combustion which can later cause misfires due to hot spots.

For any given threaded bore and spot face, sparkplug manufacturers (for example NGK Spark Plugs Mfg. (U.S.A.), Inc.) can provide sparkplugs where the arm will subtend the same angle with respect to a given angular position of the spot face with great reliability and within an error of less than ±25° of arc. This is achieved through an accurate placement of the arm with respect to the thread on the plug. However, providing a spark plug with this accuracy of thread position is only half the requirement, because if the thread in the bore of cylinder head does not itself have an accurate angular orientation of its start position, the accuracy of the thread on the plug is to no avail. Indeed, if the required position of the arm at a zero position is ±45° of arc, the positional error of the thread in the cylinder can be a maximum of ±20° of arc if the error in the plug is ±25°.

Thus the problem addressed by the present invention, although it is to be understood that the invention is not limited to its application to engines, is to provide a method of forming threads in engine cylinder heads for receipt of spark plugs where the start position of the thread with respect to a specific zero angle on the spot face is reliably determined and repeatably produced. In fact, such a problem is easily achieved with current methods, but not within the confines of the exacting requirements of mass production.

The art of producing internal threads is well explored and there are numerous methods that fall in three basic categories of cutting, forming and milling. Both cutting and forming may be considered to fall within another broad category of tapping, as both require a tool to be driven into the workpiece at an axial rate of one thread pitch per rotation. Thread forming produces a stronger thread than cut tapping or thread milling because instead of removing material, thread forming flows the grain of the metal into the desired geometry. However, milling threads with a thread miller is a much easier process to control numerically. A thread milling tool (of diameter smaller than the bore to be threaded in the case of internal bores) is rotated at high speed about its own axis, moved in a helical path corresponding with the thread to be cut and its start position is always precisely known, largely because it is essential to know before a thread can be cut.

However, returning to the specific issue of engine cylinder head manufacture and threading, modern cylinder heads often have substantial depth or volume and in many instances the bore for receipt of a spark plug will itself be at the bottom of a deep recess. The bore to be threaded is obviously easily available from underneath the cylinder head, from within the confines of the putative combustion chamber, but since the surface against which the start position of the thread to be formed must be oriented is the spot face on the outside of the cylinder head, error is introduced immediately by the multiple changes in orientation of the workpiece and change of tool required. That is to say, the machining operation needs to keep precision with: forming the spot face by machining from one side of the bore (outside of the cylinder head); rotating the workpiece to approach the bore from its other side; replacing the spot forming tool with a thread-forming tool. The inaccuracies introduced by having to rotate the part result in a less accurately orientated thread than is possible if both the thread and the spot face are machined from the same side of the part. Actually, in the case of thread cutting, the tools can be the same. That is, a thread cutting tool bit can be formed on the end of a spot face milling tool. Thus more precision can be achieved by not having to rotate the workpiece or change tools but instead use a tool which first cuts the spot face and second forms the thread, both from the same direction. Since the two features are machined by the same tool, the inaccuracies are greatly reduced to the manufacturing and setting tolerances of the tool and the positional accuracy of the machine.

This is generally possible, and even possible at the bottom of a deep recess, but there are two problems that are not overcome. The first is that the thread is a cut thread, and this is less desirable. The second is that, where the bore is at the bottom of a deep recess, the cutting tool forming the thread is necessarily on the end of a long tool that as a result introduces flexibility. The "cylindricity" (the degree to which the peaks and troughs of the cut thread lie on right circular cylindrical surfaces) cannot be guaranteed, at least not with only one pass of the cutting tool.

Thread forming is preferred and this uses a tool which is simply screwed into the bore with the same helical motion that the final thread is to have. The tool has the desired end thread formed on it, generally with points and flats so that the thread forming parts of the tool are restricted primarily to the points. The thread is formed entirely by deformation of the bore wall as the tool is progressed through the bore. There is no cutting (in the sense of material removal), from the bore. Moreover, the start position is equally easy, in principle, to assure; it is simply a matter of engaging the spot face with the tool so that the zero angular position desired for the thread start coincides, angularly, with the start of the thread on the forming tool.

However, CNC machining centres are not easily programmed to achieve a particular angular position of a tool at a particular position. Instead they are controlled to rotate and move at particular speeds and to move in particular directions. A tool moves in the x, y, z co-ordinate space, and rotates about the z-axis which is the axis of a tool holder. The tool holder certainly has a zero or start angular position, as well as a zero start position in the x, y, z co-ordinate space. Tool bits fit into the tool holder in a unique angular orientation. However, to provide a tool bit where the length of the tool and its angular position are both guaranteed with great precision, sufficient to determine the start position of the thread form, is excessively difficult and expensive to achieve. One option is to be unconcerned about such aspects and instead to simply programme the CNC machine to cut a trial thread in a first workpiece, determine where the thread starts, and then adjust the operation of the CNC machine so that in subsequent workpieces the thread is formed in the correct orientation. However, this is inefficient and creates unnecessary scrap. With the number of CNC machines used in large scale manufacturing and the low number of operators available to operate them it is also too time consuming to do this for each machine individually. Further to this, if it were to be done manually by an operator then this introduces an opportunity for human error in not setting the tool or machine correctly. This would lead to unacceptable levels of scrap parts and broken tools along with a significant amount of machine downtime which is very expensive to a large scale manufacturing business.

It is an object of the present invention to provide a method of reliably forming an angularly oriented thread on or in a workpiece using a CNC machining centre, such as in an engine cylinder head for receipt of spark plugs, in a way which guarantees that the first part produced is within specification without special operator interaction.

SUMMARY OF THE INVENTION

In accordance with the present invention there is provided a method of forming a thread on a workpiece comprising the steps of:

providing a CNC machining centre with a tool holder movable in an x, y, z co-ordinate space and rotatable about the z-axis, wherein the tool holder has a CNC datum face and a reference position of the datum face in said x, y, z space and about said z-axis;

providing a thread-producing tool, optionally a thread-forming tool, having a thread-forming tip with a thread of pitch P between adjacent turns of the thread, a tool axis and a tool datum face remote from the tip, the tool being fixable in said tool holder with the tool datum face in fixed axial and angular relation to the CNC datum face, and with the tool axis coincident with said z-axis;

disposing said tool in a tool presetter;

in the tool presetter, measuring the length L of the tool along its rotation axis between the tool datum face and a distal end of its thread-forming tip;

in the tool presetter, measuring in a first plane containing the tool axis the distance D' between a complete thread-forming peak, being the $n^{th}$ turn of the thread from the tip distal end of the tool, and the tool datum face, and determining therefrom the corresponding distance D in the zero plane containing the reference position when the tool is in the tool holder of the CNC machining centre, based on the relation $D=D'+\beta P/360$, where $\beta$ is the angle between said first and zero planes;

defining a spot face surface on the workpiece at which a thread, to be formed, is to commence at a predetermined start angle with respect to the thread axis;

fitting the tool in the tool holder of the CNC machining centre and positioning the datum face of the tool holder at a start position being a distance A from the spot face and angle $\alpha$ degrees between the reference plane of the datum face and the start angle, where $$A=L+\alpha P/360+c+(L-D-(n-0.5)P)$$

where c is a constant equal to an integer multiple of the pitch P; and driving and rotating the tool and tool holder from the start position towards the workpiece at an axial rate of P per revolution of the tool until the thread is formed.

Said defining a spot face surface on the workpiece may be achieved via a machining operation such as milling or drilling, by measuring the position of the surface, for example with a touch probe within the CNC machine, or by holding the work piece in a fixture which defines the position of this face.

The foregoing thread forming method is based on the premise that the angle $\theta$ between the start $\varphi_T$ of the thread at the tip of the tool with respect to the angular position $\varphi_C$ at which the distance D is determined can be calculated from the relation $\theta=360(L-D-(n-0.5)P)/P$. Therefore, if the tool is set back axially from spot face by the amount $(L-D-(n-0.5)P)$, and progressed at the angular rate of 360° per distance P advanced axially, the tool will have rotated to the correct angular position at the point when the tip coincides axially with the spot face and commences forming the thread on or in the workpiece.

The foregoing is also based on the premise that, at the start position of the thread, the $n^{th}$ thread (for example, the fifth) is $(n-0.5)P$ (that is, the fifth is 4.5 P) from end of the tool. This is because the start position of the thread is at the trough of the thread, half a pitch length from the first peak of the thread.

$\alpha$ and c may each, separately or together, be zero. In some embodiments n may be between 4 and 7. Incidentally, what is important is the distance A rather than the precise mode of its derivation. For example, A, in some instances not only equals $L+\alpha P/360+c+(L-D-(n-0.5)P)$ but also equals $L+\alpha P/360+c_2+(L-D-0.5 P)$, where $c_2$ is selected as a value equal to $(c-nP)$.

The first three or four turns of a thread forming tool tend to be on a conical surface of the tool near the end of its tip (of reducing diameter towards the end of an internal thread-forming tool), so that the first turns do not form the entire thread but only start the thread forming process. Thus the fifth turn is usually the first or second complete turn and its distance from the tip establishes strongly the location of the overall thread and hence the precise distance (both axially and angularly) to the start position of the thread.

In one embodiment the distances L and D are determined using a measuring device. For example, the length measurements made when the tool is in the tool presetter may be made with a camera or other optical device. (Other methods are possible, such as a touch probe or non-light radiation such as x-ray.) In the specific example of a camera, where the tool is an internal thread-former, the position of the camera may first be "zeroed" with respect to the tool datum face, both axially and angularly, and then moved in a direction parallel with the tool axis until it is coincident with the tool tip, whereupon the length L of the tool is determined. The camera is then moved back towards the datum face by 5 P (or nP, if thread chosen to be measured is not the fifth). In the first instance, it will most likely be necessary to rotate the tool so that the camera focuses on a point of the thread former. That is to say, most thread forming tools do not have a circular section but have a polygonal section, possibly with curved sides, indeed, possibly a Reuleaux polygon such as a pentagon. Thus, the tool may first be turned through an angle $\beta$ from the zero or reference position until the camera focuses on a point of the tool. Then, the precise distance from the tool tip may be determined and the angular position of the thread start position at the tip calculated, given the pitch P of the thread (which is most likely known but could be measured). This gives the angle $\gamma$ from the measured position to the thread start position so that the angle $\theta$ of the thread start position from the reference position of the tool is given by $\theta=\gamma\pm\beta$, depending on the direction of rotation of the tool from the datum position to the point at which the measurement is made. Although these angles are capable of being known, they are not required (except $\beta$) to enable the quantity $(L-D-(n-0.5)P)$ to be determined. When it is determined, it is assigned to and recorded with that tool as its nominal length for when that tool is subsequently employed in a CNC machining centre. Indeed, once installed in the CNC machining centre the angular position of the tool (and its thread start) is fixed with respect to the reference position of the CNC machine. Consequently, provided the rotation of the tool in the CNC machine is controlled as well as its axial movement, the position in the x, y, z co-ordinate space of the start position of the thread on the thread forming tool is thereafter known without any further angular measurements (beyond counted rotations of the tool).

In one embodiment, the work piece is an internal bore. Moreover, it may be the internal bore of an engine cylinder head, the bore being for reception of a sparkplug, whereby the earth terminal arm of the sparkplug may have a predetermined position in the cylinder of the engine. In this event, if thread rolling is the intended method of thread machining, it is preferred that a first drilling of the bore is performed from an inside (or "fire") surface of the cylinder head, whereby a chamfer can be formed on the fire face into which the burr formed by the subsequent thread rolling operation can be rolled without protruding into the combustion chamber. A burr within the combustion chamber could become loose while the engine is in operation and could lead to engine failure. The burr could also form a hot spot in the combustion chamber resulting in pre-ignition of the fuel, or "knocking" which significantly reduces the effective life of the engine, its efficiency and its power output. The workpiece is then preferably rotated and the spot face is milled from the outside (or "cover") surface of the cylinder head. When the spot face is milled this, of course, presets its position with respect to the CNC machining centre tool holder datum face. However, the tool is changed, once all spot face milling operations on the head are completed, to a thread-forming tool whose quantity $(L-D-(n-0.5)P)$ is known from the previous measurement and recording process. This quantity is used by the CNC machining centre to position the thread-forming tip at the desired distance from the spot face and from there to commence the thread-forming operation.

In the latter regard, it is to be noted that the long depth from a free surface of the cylinder head to the spot face, which depth is a feature of modern cylinder heads, is not a disadvantage with the current proposal. In the first place, the spot face milling operation has little side loading, given that the machining is of a face orthogonal with respect to the tool axis of the mill employed. In any event, a pilot extension of the milling tool enters and is centred and supported by the predrilled hole (which drilling was performed, as just mentioned, from the fire side where there is no difficulty with access to the surface being drilled). In the second place, the thread-forming tool is supported on each point by the hole being threaded, and therefore the length of the tool shaft (between the thread-forming tip and the plug carrying the tool datum face and received in the tool holder) is not only not a problem but is, in fact, a positive advantage. This is because the tool shaft can have a degree of flexibility enabling it to deflect if the thread forming tool is not perfectly aligned with the axis of the hole. Thus, instead of a thread mill cutting an off-centre thread, the thread produced by a thread-forming tool, also called a form tap, is likely to be more concentric with the bore axis.

In an embodiment the thread-forming tool may be provided with a tool shaft between its holder and the thread former that is at least three times, indeed optionally five times, the diameter of the shaft whereby the shaft provides flexibility which corrects any misalignment between the thread-forming tool and the bore.

In a further aspect of the invention for which protection is sought there is provided a method of arranging the position of a spark plug at a predetermined angular position in the cylinder head of an internal combustion engine, comprising the steps of:
providing spark plugs with predetermined angular positions of ground electrodes with respect to a thread employed to secure the spark plug in the cylinder head;

forming a bore in an engine cylinder head to receive said spark plugs and having a thread with a predetermined start position, by:

a. providing a CNC machining centre having a toolholder for tools;
b. providing a cylinder head with a bore to be threaded and to receive spark plugs;
c. using a milling tool in the CNC machine, milling a spot face around the bore from a cover side of the cylinder head;
d. changing the tool in the CNC machine to a thread-forming tool for which the quantity (L−D−(n−0.5)P) has previously been determined from measurements made of the tool, where L is the length of the tool from its tip to a datum face, which datum face is adapted to engage with a corresponding datum face in a CNC machine, D is the length of the tool from its nth thread, counted from the tip, to the datum face in a plane containing a longitudinal axis of the tool and a zero reference position of the tool employed by the CNC machine, and P is the pitch of the thread form;
e. positioning the tool holder at a start position with its datum face at a distance A from the spot face and angle α degrees between the zero reference position and the start angle, where A=L+αP/360+c+(L−D−(n−0.5)P) where P is the pitch of the thread and c is a constant equal to an integer multiple of the pitch P; and
f. driving and rotating the tool and tool holder from the start position towards the workpiece at an axial rate of P per revolution of the tool until the thread is formed.

In an embodiment the bore in the cylinder head may be formed by the steps of:
g. drilling a bore in the cylinder head from a fire side of the cylinder head; and
h. turning the cylinder head in the CNC machine to permit access to the cover side by said milling tool and thread-forming tool.

In a further aspect of the invention for which protection is sought there is provided an engine comprising a cylinder head with a sparkplug in each of multiple combustion chambers defined by the cylinder head, wherein the sparkplugs are consistently aligned with respect to respective fuel injector positions in each combustion chamber, wherein the threads in the cylinder head receiving the spark plugs have been formed by thread forming. Optionally, the threads may have been formed by the method described above.

In a further aspect of the invention for which protection is sought there is provided a method of manufacturing an engine comprising:
forming a thread in the internal bore of an engine cylinder head using a method as described above.

In a further aspect of the invention for which protection is sought there is provided a method of manufacturing a vehicle comprising:
manufacturing an engine using a method of manufacture of an engine as described above.

In a further aspect of the invention for which protection is sought there is provided a programme for a CNC machining centre, the programme being configured to instruct the CNC machining centre to implement the a method of forming a thread in a workpiece as described above. For example, the programme may be configured to require an input corresponding to the measurements L, D, n and P, or the value of (L−D−(n−0.5)P), in order to instruct the CNC machining centre to implement a method of arranging the position of a spark plug at a predetermined angular position in the cylinder head of an internal combustion engine as described herein.

The invention defined in the claims has a primary application where the threads are formed, rather than cut, and the invention will be described primarily with reference to the production of formed threads. Nevertheless, the present invention is also applicable to cut threads produced using a cutting tap. Unless the context requires otherwise the term "tapping" includes both cutting a thread by the use of a cut tap, as well as thread forming using a form tap. Accordingly, a "tapping tool" may be either a cutting tap or a forming tool.

Both cut thread tapping and thread forming can benefit from the method of the present invention. It will be understood that material is only removed when the thread is produced by a cutting tap, and that only displacement of material is required when a thread-forming tool is used.

BRIEF DESCRIPTION OF THE DRAWINGS

An embodiment of the invention is further described hereinafter with reference to the accompanying drawings, in which.

DETAILED DESCRIPTION

Figure 1:
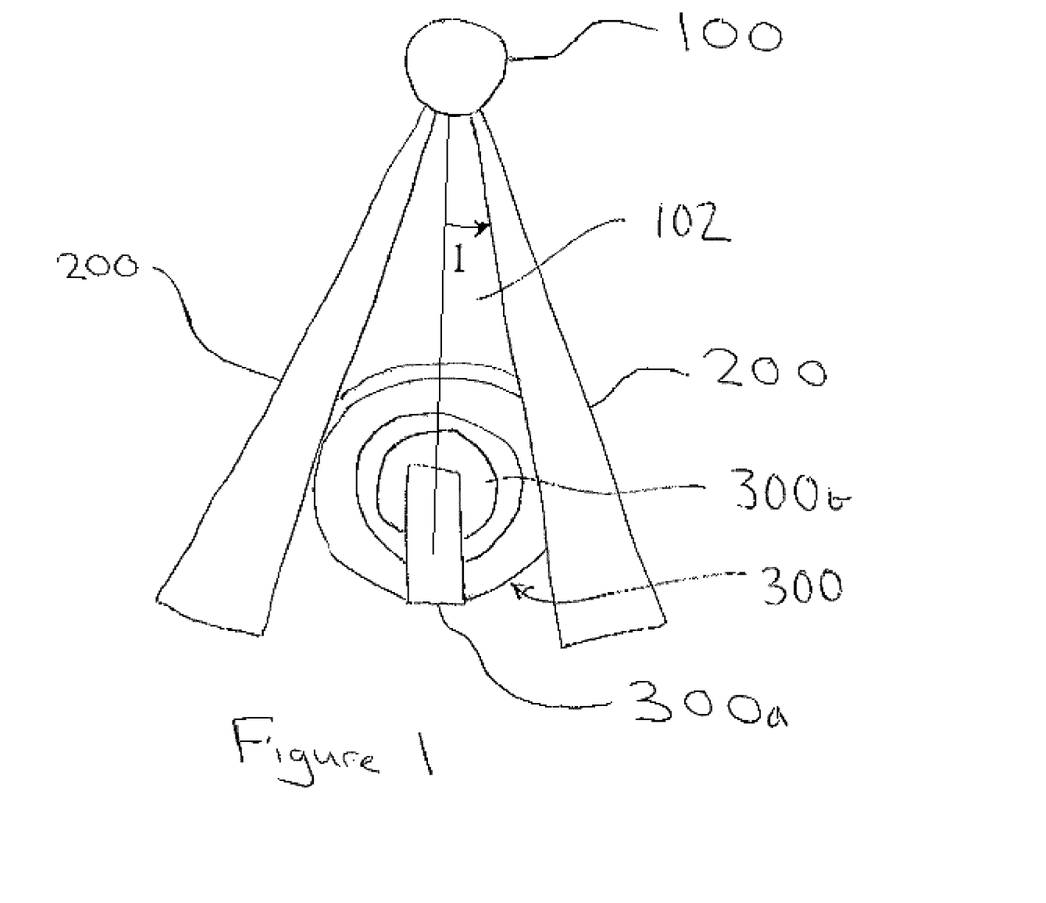
FIG. 1 shows the injection of fuel into an engine cylinder near a spark plug.

FIG. 1 shows the fuel spray into an engine cylinder of an internal combustion engine. Injector 100, disposed in the engine's cylinder head 102, sprays fuel jets 200 inter alia on either side of a spark plug 300 protruding into the engine cylinder and secured via a thread in the cylinder head 102. The Injector produces several jets of fuel spray, in this case six. As a consequence of this, in this situation, the spark plug electrode can never be more than 30° from a fuel spray. This maximum angle between the spark plug electrode and the injector spray (l) can be calculated via the equation l=360/(2$n_s$) where $n_s$ is the number of jets of fuel the injector produces assuming an equal angular distribution. However, if the liquid fuel jets between the spark plug electrodes 300a and 300b, the fuel may displace the ionised gas between them. The ionised gas forms in the instant before a spark develops (and is a necessary pre-cursor for that development). Its displacement may prevent the spark from happening and cause the engine to misfire. This jetting between the electrodes 300a,b may occur if the fuel is misdirected by the injector 100, or if it makes contact with the spark plug ground electrode 300a, Furthermore, wetting of the electrodes may cause a build-up of carbon to form on them after combustion, potentially itself causing misfires. Moreover, the fuel jet induces air proximal to the jet via the venturi principle which means that it is not necessary for the fuel jet to directly foul the spark plug in order to cause a misfire, it may also displace the ionised gas indirectly via the air displaced in proximity to the jet. It follows that it is optimal to maximise the distance between the spark plug and the fuel jet and any deviation which closes this proximity reduces the strength of the spark and thus reduces the effectiveness of the combustion which leads to incomplete combustion, worse emissions, worse fuel economy and reduced power.

To ensure that the fuel spray does not come into too close proximity with the electrodes prior to combustion it is clearly necessary to ensure accurate spray 200 of fuel and also to control the angular position of the spark plug. For the spark plug illustrated in FIG. 1 the spark plug is ideally located at the 6 o'clock position, with an approximate tolerance of +/−45 degrees before contact between the electrode 300*a* and the fuel sprays 200 is likely to occur.

Spark plugs can be manufactured with the electrode 300*a* in a known position relative to the thread on its shank, with a tolerance of approximately ±20-25°. However, it is also necessary to ensure that the angular position of the thread in the bore of the cylinder head 102 is also controlled, otherwise the electrode of the spark plug will not be accurately positioned relative to the fuel injector 100 and the accurate positioning of the electrode on the spark plug will be to no avail.

The preferred method for producing threads in the automotive industry is forming, in which a tool having peaks and troughs which define the shape of the thread is advanced into the work piece whilst being rotated through one complete revolution in the time taken to advance the work piece by a distance equal to the pitch of the desired thread. In this way the material is displaced to produce the thread without removing material.

A disadvantage of thread forming, as compared to thread milling, for example, is that the start position of the thread is typically arbitrary. This is because the start of the thread-forming peaks on the thread-forming tool are positioned at arbitrary angular locations.

Figure 2:
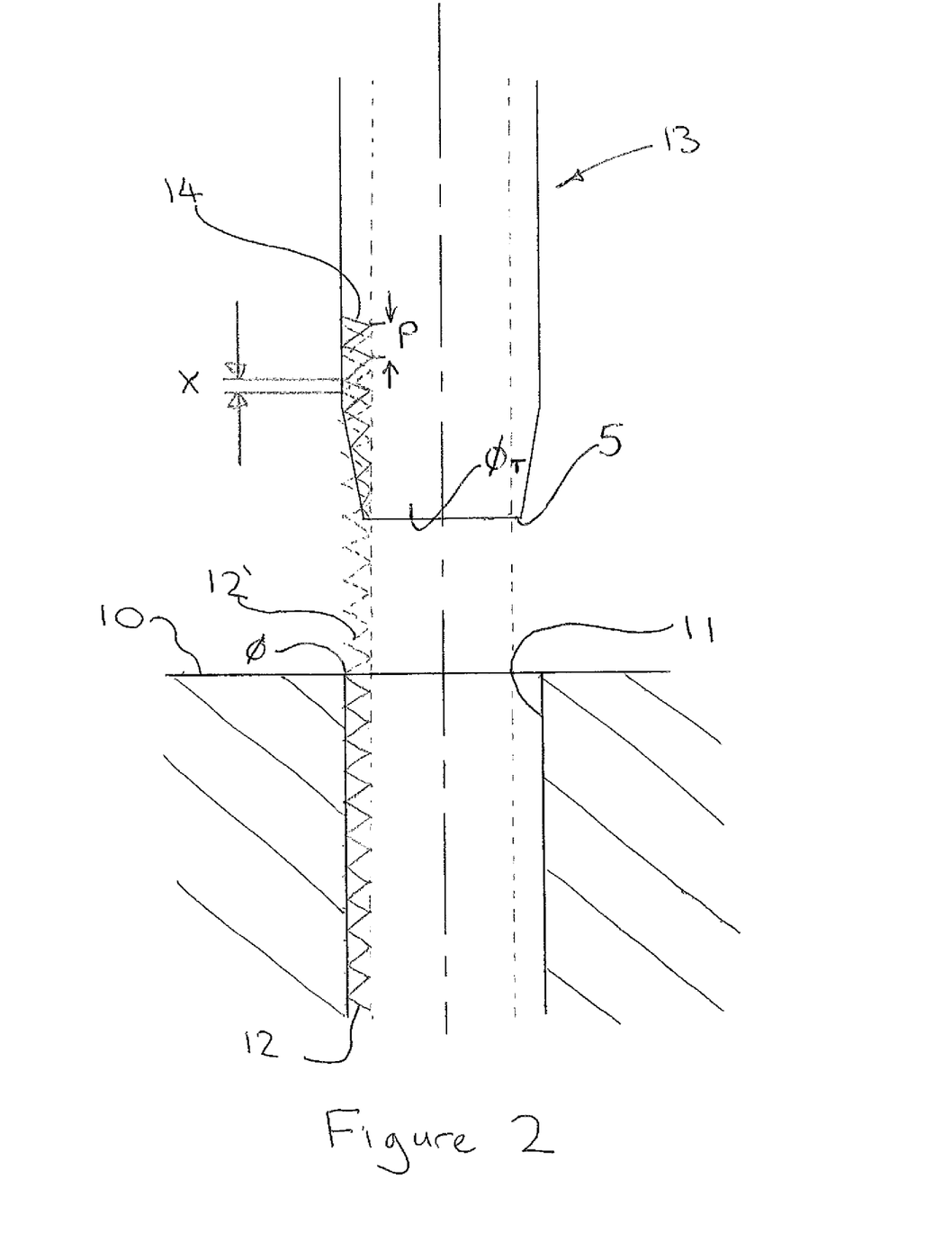
FIG. 2 shows a thread forming tool and a bore in which a thread is to be formed.

FIG. 2 shows a tool 13, which is disposed in a CNC machining centre (not shown), and a workpiece having an internal bore 11 in which thread 12 is to be machined at a predetermined start point $\varphi$. Tool 13 is configured with its own thread form 14 to machine a thread having the desired pitch P, but because the start point $\varphi_T$ of the thread form 14 on tool 13 is unknown, the thread is unlikely to begin at the desired start point $\varphi$ in the workpiece 10. In FIG. 2, the tool is shown in a position where the thread form 14 on the tool 13 does not correspond to the ghost thread 12', which is an extension of the desired thread 12 in internal bore 11. Therefore, if tool 13 is advanced toward the workpiece at an axial rate of P per revolution of the tool, then the thread obtained would be axially offset from the desired thread by a distance X, and its start position angularly offset by an angle $(\varphi-\varphi_T)$. Indeed, that offset is easily calculated by the relationship $(\varphi-\varphi_T)=360X/P$, where $(\varphi-\varphi_T)$ is in degrees.

The present invention provides a method for forming a thread on a workpiece at a predetermined start position $\varphi$ by offsetting the tool vertically with respect to the workpiece by a predetermined distance (that is, in this case, X, or P-X, depending on the direction) to ensure that the thread on the tool corresponds to the desired thread on the workpiece.

Figure 3A:
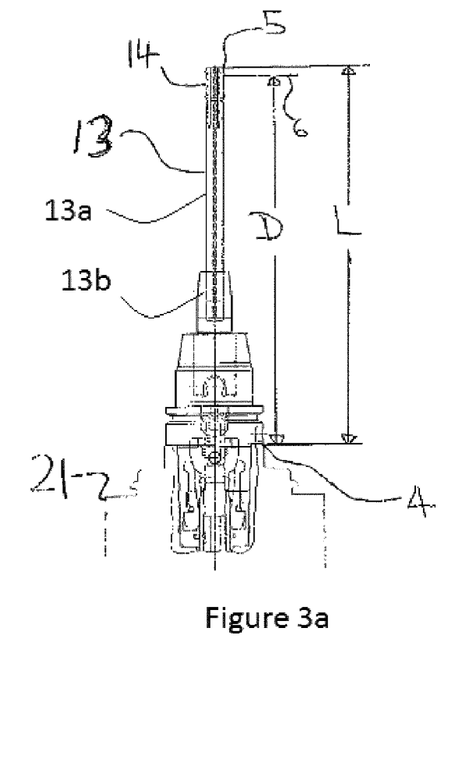
FIGS. 3a and b show respectively a tool disposed in a tool presetter and in detail the end points of the lengths L and D.

FIG. 3*a* shows tool 13 disposed in a tool presetter 21. (Presetter 21 could, in theory, be the CNC machining centre in which the tool is ultimately to be employed. However, this would be inefficient use of the CNC machine and is not preferred.) The tool presetter is configured to receive the tool in the same axial and rotational position as does the tool holder in a CNC machining centre, assuming this is a different component to the presettter. The tool 13 has a datum face 4, which is designed to fit in the presetter 21, and in the toolholder of the CNC machine, at a unique and precise angular and axial position, thereby accurately defining the position of the thread form 14. However, what that position is, is both arbitrary and variable between different tools 13. The tool presetter 21 is configured to measure the overall length L of the tool, from the tool datum face 4 to its distal end face 5. It is also configured to measure the axial distance D from a complete thread-forming peak 6 (see FIG. 3*b*) to the datum face 4. The distal end points of lengths D and L are best seen in FIG. 3*b*.

Figure 3B:
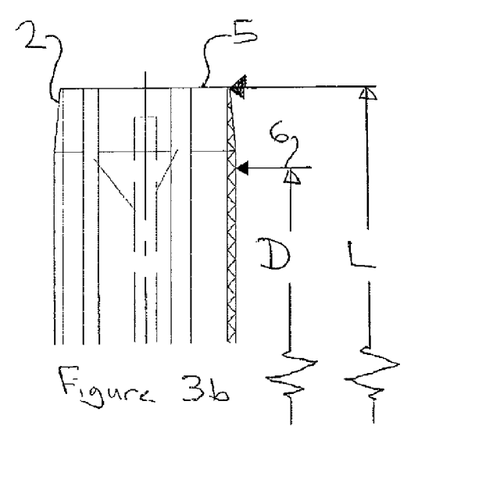

In the embodiment shown in FIG. 3*b* the first three peaks are smaller than the rest of the thread-forming peaks and do not form an entire thread. These provide a lead into the bore 11 and commence the thread forming operation. Distance D is measured to the fifth turn of the thread (its thread-forming peak) from the distal end of the tool, which is the second full thread-forming peak. It is of course possible to use any turn of the thread as the distal end point of length D, although it is undesirable to use any of the turns that do not form a complete thread as these do not form a sharp point and therefore it is difficult, if at all possible, to measure their position using the current capabilities of a tool presetter.

Figure 4:
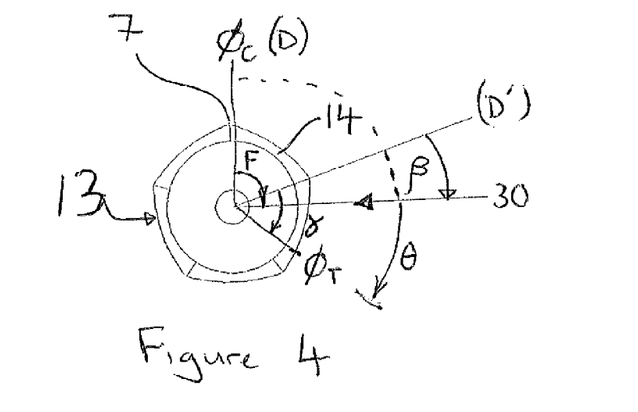
FIG. 4 is an axial view of a tool and shows the location of thread forming points on the tool and the rotation of the tool so that a point aligns with a camera viewing plane.

Determination of the lengths D and L is performed using a camera or other optical device (not shown). A touch probe or non-light radiation such as x-ray could also be used. As shown in FIG. 4, points 7 of the thread-form 14 of the tool 13 are only present at certain angular positions. The tool has a polygonal section with curved sides between the points. Indeed, the section may be a Reuleaux polygon such as a pentagon. This shape causes the thread forming parts of the tool to be restricted primarily to the points 7 and thus reduces friction between the tool and workpiece during the thread-forming process. It may therefore be necessary for the tool presetter to rotate the tool 2 so that one line of the points 7 protrudes in a perpendicular direction to the viewing direction of the camera, shown by arrow 30, in order to be sure that it is the main thread forming component of the tool 13 that is measured. If rotation of the tool is required, then the length D at the zero angular (reference) position (of the tool) cannot be directly measured. However, given the pitch P, the distance D' that is measured between the datum face and the $n^{th}$ peak after the rotation is performed, together with the angle $\beta$ through which the tool is rotated, permits the distance D at the zero angular position $\varphi_C$ for the tool to be determined. That is to say, D' (which is not shown in the drawings as a measurement) is the distance D (which is shown in the drawings) but at a different angular position of the tool 13. D' is equal to D±P $\beta$/360, where $\beta$ is in degrees.

FIG. 4 shows the position before rotation and assumes a zero or reference position $\varphi_C$ for the tool, a viewing plane 30 (at an angle F to the reference position), and an angle $\beta$ between the viewing plane and a point 7 of the thread formation. The measured position is not shown, but, in that position, the tool is rotated relative to the viewing plane 30 through the angle $\beta$.

Having measured the distances D' and L, the angle $\gamma$ between the start $\varphi_T$ of the thread at the tip 5 of the tool relative to the angular position at which distance D' is measured can be calculated from the relation $\gamma=360(L-D'-(n-0.5)P)/P$, where P is the pitch of the tool and when the distal end point of the distance D' is taken to be the $n^{th}$ peak from the tip distal end 5 of the tool 13. In the embodiment illustrated in FIG. 3*b*, D is to be determined to the fifth peak from the tip distal end, and hence n is equal to 5. If the zero position $\varphi_C$ of the tool does not coincide with the direction 30 from which the measurement D' is made, then an allowance is also required for that angular difference, equal to (F±β))P/360. However, for the sake of simplicity (and not as shown in FIG. 4), $\varphi_C$ is taken henceforth to be coincident with the direction of arrow 30, in which event, the required offset disappears (F and β are both zero degrees). However, this will not normally be the case because the tool shaft (13*a* in FIG. 3*a*) is not carefully positioned in its holder 13*b*. Thus, normally, at least the offset βP/360 must be used to adjust the measured value D' to arrive at the desired value D at the tool reference position $\varphi_C$.

The angle θ, being the angle between the start $\varphi_T$ of the thread at the tip of the tool relative to the zero angular position of the tool $\varphi_C$, can then be calculated from the relation θ=γ±β±F, the sign of the β and F terms being determined by the direction of the rotation of the tool from the datum position to the peak 7 at which the measurement is made, as well as the built-in offset F, if any. It is necessary to apply the correction term±β only if the tool is rotated from the zero reference position before the measurement of D' is performed. Clearly if no rotation is performed (and F is 0), then D'=D and θ=γ, so that the relation γ=360(L−D'−(n−0.5)P)/P is equivalent to θ=360(L−D−(n−0.5)P)/P.

However, it is not actually a requirement to determine the angle θ since it is the quantity X=(L−D−(n−0.5)P) (where X is the offset mentioned above with reference to FIG. 2) that is employed to position the tool in the CNC machining centre, as explained further below. However, where X=0 or P, then θ=0° or 360°, which are the same, of course.

Figure 5A:
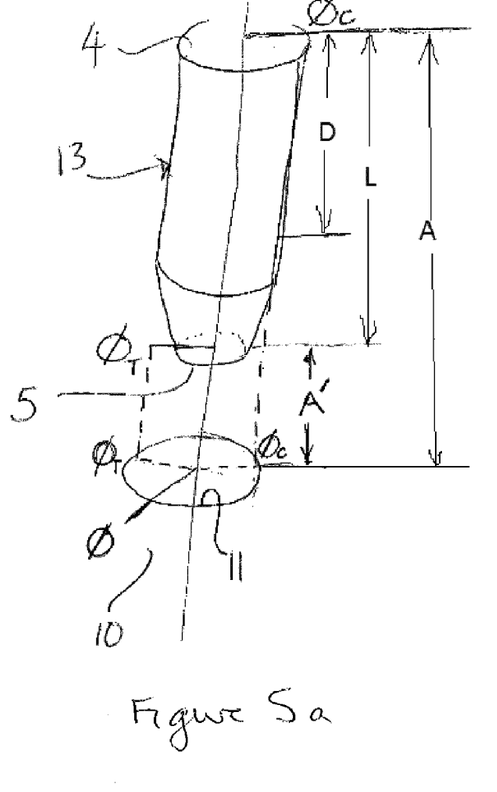
FIGS. 5a and b show schematically the angles involved in calculation of the thread start position in accordance with the present invention.

Referring to FIG. 5*a*, the distance A' is the amount added to the measured length L and reported (as distance A) to the CNC machine as the length of the tool. That is, A (being the length of the tool reported to the CNC machine)=A'+L. Thus, when the CNC machine uses the tool 13, it moves it to address the workpiece 10 by positioning the tip 5 at the opening 11 in the zero angular position $\varphi_C$ of the tool 13 (assumed coincident with the zero reference position of the CNC machine). However, this will in fact leave a gap A' between the tool tip 5 and the opening 11.

This gap is arranged to be appropriate so that, when the CNC commences its drive, moving the tool 13 axially downwardly toward the workpiece 10 at a rate of P per revolution of the tool, the tool makes contact with the workpiece with $\varphi_T$, the start position of the thread former 14, being coincident with φ, the desired start position of the thread to be formed in the bore 11. Indeed, the thread form 14 is coincident with the ghost thread 12' (see FIG. 2), being the thread extended from the desired thread 12 to be formed in the bore 11.

Figure 5B:
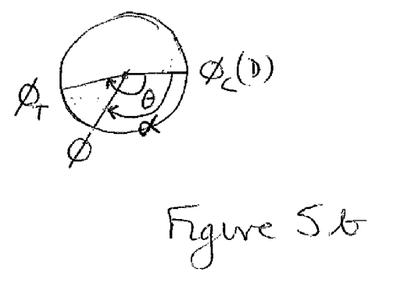

In this respect A' equals (αP/360+c+X), where, as mentioned above, X is the quantity (L−D−(n−0.5)P), the axial offset (X) required of the tip 5 of the tool from the opening of a bore in which a thread is to be formed when the tool is to be advanced at a rate of one pitch per revolution. c is an integer multiple of the thread pitch (ie c=mP, where m is an integer). αP/360 is simply an arbitrary offset to accommodate any difference in angle α between the zero start position $\varphi_C$ of the tool holder in the CNC machine and the desired start position φ of the thread in the bore 11. FIG. 5*b* is a plan view showing the positions φ, $\varphi_C$ and $\varphi_T$ superimposed on the same plane.

A thread having a desired start position may therefore be machined by fitting the tool 13 into the tool holder of a CNC machining centre (not shown) and positioning the tool holder (with the relevant tool inserted) at a zero start position, being a distance A=A'+L from a spot face (10) machined onto the workpiece, and an angle α degrees from the zero position $\varphi_C$ of the datum face.

The determination of the distance X=(L−D−(n−0.5)P) of a tool in a presetter enables the subsequent use of the tool in a CNC machine which does not have means to determine the lengths D and L, and nor, typically, the means to measure specific angles of turn. However it must be able to orientate the spindle to a known '0' position prior to commencing the machining operation.

Of course, it may be that a CNC machining centre is provided with measurement means. This is unlikely to be satisfactory because a machining centre involves splashing coolant that may well interfere with precise measurements. Furthermore, interrupting manufacturing operations to make the measurements described above may not be a commercially sensible employment of the machining centre. Nevertheless, it is at least possible that the tool presetter described herein and the CNC machining centre may be one and the same tool.

In a particular application, the invention relates to a method for forming a thread in the cylinder head of an internal combustion engine.

Figure 6:
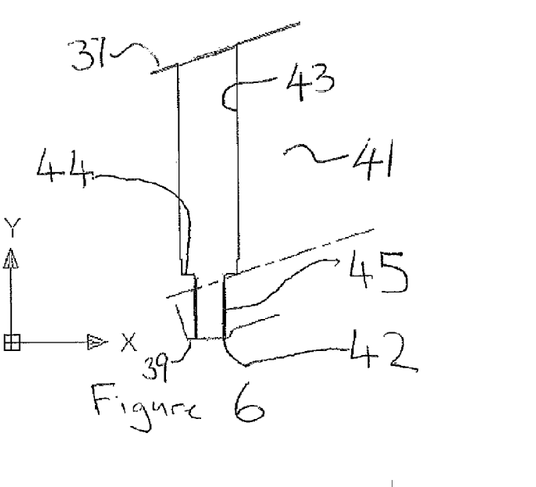
FIG. 6 shows a cross section of a bore configured to receive a spark plug in an engine cylinder head.
Figure 7A:
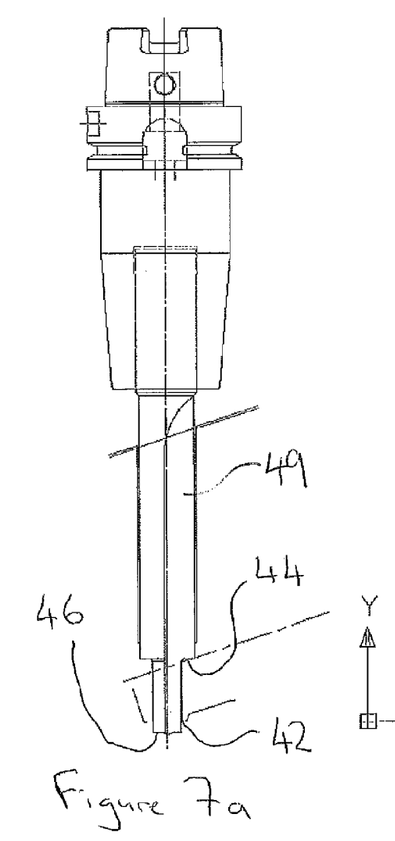
FIG. 7a shows the milling of a spot face in a bore configured to receive a spark plug in an engine cylinder head.
Figure 7B:
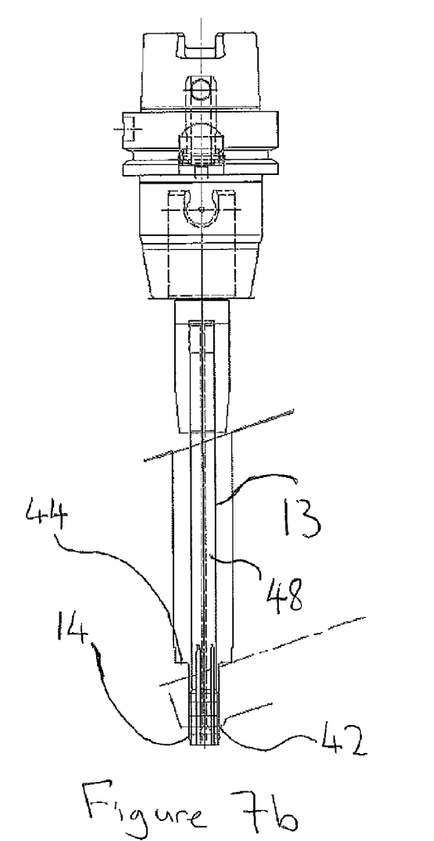
FIG. 7b shows the forming of a thread in a bore configured to receive a spark plug in an engine cylinder head.

In FIGS. 6 and 7*a,b*, an engine cylinder head 41 has a recess 43 formed in a cover side 37 of the head and adapted to receive insertion from the cover side of a spark plug (not shown). The spark plug is to be screwed into a threaded part 45 of a bore 42 at the base of the recess 43 and to protrude into a fire side 39 of the cylinder head inside the combustion chamber of the engine. In one embodiment, the invention provides a method for forming the thread 45 in the bore 42.

As described above with respect to FIG. 1, it is desirable to control the start position of the thread in bore 42 so that a spark plug with a known electrode position inserted therein, and with a given tightness, will have its electrode disposed in a predetermined orientation relative to the fuel injector so as not to interfere with fuel injected by the injector.

FIG. 6 shows a cross section through the bore 42, having a spot face 44 at the bottom of the recess 43, and thread 45. The bore 42 and thread 45 are formed by the steps of, in a CNC machining centre:

a. drilling bore 42 from the fire side 39 of the cylinder using a drill (not shown) and cutting a chamfer (not shown);

b. turning the workpiece in the CNC machining centre and, from the cover side 37 of the cylinder head 41 and with a tool 49 (see FIG. 7*a*), milling spot face 44 and opening out the diameter of the bore 45 with pilot 46 of the tool 49;

c. changing the tool to a thread forming tool 13 for which the quantity X=(L−D−(n−0.5)P) has previously been determined and positioning the tool as described above such that a thread will be formed at a desired start position; and     d. forming a thread on the internal surface of the bore 42.

The chamfer preferably formed on the fire face during the drilling of bore 42, leads the combustion chamber walls to the area where the spark plug electrodes will be located. It also serves to roll out the burr formed during thread forming so that it is not left in the combustion chamber at the end of the process.

FIG. 7*a* illustrates the milling of the spot face 44 using the tool 49, which tool includes a drill 46 which engages the pre-drilled surface of bore 42 and centres and supports the tool 49 with bore 42 so that the length of the tool 49 does not lead to any significant tolerance errors (eg due to flexibility of the shaft). Indeed, the drill 46 aids concentricity; it does not affect orientation. It is there also or more especially to give a tight tolerance surface finish, which requires removing a relatively small amount of material.

In FIG. 7b, the thread former 14 is provided on an end of a relatively long and thin tool shaft 48 of the tool 13. The thread former 14 is supported by the surface of bore 42. Thus the flexibility afforded by the relatively long shaft 48 allows any small error in the radial position of the bore 42 relative to the tool 13 to be accommodated by slight pliancy in the shaft. This ensures that the thread is accurately centred in bore 42. If a thread mill was used over the same tool length as this form tap, the tool would deflect and the thread produced would be undersize and potentially conical. This would require a second machining pass to achieve the full diameter and would reduce the tool life due to the inherent process sensitivity to tool edge sharpness. It is for this reason that tapping tools, especially thread forming taps, are preferred to thread mills in this application, since they are not sensitive to extended lengths.

The present invention has special application in the forming of cylinder heads for internal combustion engines in which the electrode position of the spark plugs used is important to engine efficiency. However, the invention may have wider application in the process of forming threads with precise starting positions. The skilled person would not have any difficulty in applying the teachings of the present invention to such alternative applications.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Further aspects of the present invention will be understood by reference to the following numbered paragraphs:

1. A method of forming a thread on a workpiece comprising the steps of:
   providing a CNC machining centre with a tool holder movable in an x, y, z co-ordinate space and rotatable about the z-axis, wherein the tool holder has a CNC datum face and a reference position of the datum face in said x, y, z space and about said z-axis;
   providing a thread-forming tool having a thread-forming tip with a thread of pitch P between adjacent turns of the thread, a tool axis and a tool datum face remote from the tip, the tool being fixable in said tool holder with the tool datum face in fixed axial and angular relation to the CNC datum face, and with the tool axis coincident with said z-axis;
   disposing said tool in a tool presetter;
   in the tool presetter, measuring the length L of the tool along its rotation axis between the tool datum face and a distal end of its thread-forming tip;
   in the tool presetter, measuring in a first plane containing the tool axis the distance D' between a complete thread-forming peak, being the $n^{th}$ turn of the thread from the tip distal end of the tool, and the tool datum face, and determining therefrom the corresponding distance D in the zero plane containing the reference position when the tool is in the tool holder of the CNC machining centre, based on the relation $D=D'+\beta P/360$, where $\beta$ is the angle between said first and zero planes;
   defining a spot face surface on the workpiece at which a thread, to be formed, is to commence at a predetermined start angle with respect to the thread axis;
   fitting the tool in the tool holder of the CNC machining centre and positioning the datum face of the tool holder at a start position being a distance A from the spot face and angle $\alpha$ degrees between the reference plane of the datum face and the start angle, where $$A=L+\alpha P/360+c+(L-D-(n-0.5)P)$$

where c is a constant equal to an integer multiple of the pitch P; and
   driving and rotating the tool and tool holder from the start position towards the workpiece at an axial rate of P per revolution of the tool until the thread is formed.

2. A method as claimed in paragraph 1, in which one or both of $\alpha$ and c are zero.

3. A method as claimed in paragraph 1 or paragraph 2, in which n is between 4 and 7.

4. A method as claimed in any preceding claim, in which the distances L and D are determined using a measuring device.

5. A method as claimed in paragraph 4, in which the thread-forming tool comprises points and flats of a thread-forging thread around its circumference and the tool is rotated around a measured offset angle in the presetter until a point of the peak of the $n^{th}$ thread-forging thread aligns with a measuring plane of the measuring device before measuring the distance D', said plane containing a longitudinal axis of the tool.

6. A method as claimed in any preceding claim, in which the workpiece is an internal bore.

7. A method as claimed in paragraph 6, in which the internal bore is the internal bore of an engine cylinder head.

8. A method as claimed in paragraph 7, in which the bore is the reception for a spark plug.

9. A method as claimed in paragraph 8, in which the internal bore is drilled from a fire surface of the cylinder head, whereby a chamfer can be formed on the fire surface leading to the area where the spark plug electrodes will be seated.

10. A method as claimed in any of claims 7 to 9, in which the spot face is milled from the cover surface of the cylinder head.

11. A method as claimed in any of claims 7 to 10, in which the thread forging tool is provided with a tool shaft between its holder and the thread forger that is at least three times, indeed optionally five times, the diameter of the shaft whereby the shaft provides flexibility which corrects any misalignment between the thread forging tool and the bore.

12. A method of arranging the position of a spark plug at a predetermined angular position in the cylinder head of an internal combustion engine, comprising the steps of:

providing spark plugs with predetermined angular positions of ground electrodes with respect to a thread employed to secure the spark plug in the cylinder head;

forming a bore in an engine cylinder head to receive said spark plugs and having a thread with a predetermined start position, by:

a. providing a CNC machining centre having a toolholder for tools;
b. providing a cylinder head with a bore to be threaded and to receive spark plugs;
c. using a milling tool in the CNC machine, milling a spot face around the bore from a cover side of the cylinder head;
d. changing the tool in the CNC machine to a thread-forming tool for which the quantity $(L-D-(n-0.5)P)$ has previously been determined from measurements made of the tool, where L is the length of the tool from its tip to a datum face, which datum face is adapted to engage with a corresponding datum face in a CNC machine, D is the length of the tool from its $n^{th}$ thread, counted from the tip, to the datum face in a plane containing a longitudinal axis of the tool and a zero reference position of the tool employed by the CNC machine, and P is the pitch of the thread form;
e. positioning the tool holder at a start position with its datum face at a distance A from the spot face and angle α degrees between the zero reference position and the start angle, where $A=L+\alpha P/360+c+(L-D-(n-0.5)P)$ where P is the pitch of the thread and c is a constant equal to an integer multiple of the pitch P; and
f. driving and rotating the tool and tool holder from the start position towards the workpiece at an axial rate of P per revolution of the tool until the thread is formed.

13. A method as claimed in paragraph 12, in which the bore in the cylinder head is formed by the steps of:

g. drilling a bore in the cylinder head from a fire side of the cylinder head; and
h. turning the cylinder head in the CNC machine to permit access to the cover side by said milling tool and thread-forming tool.

14. A method as claimed in paragraph 4, or any of claims 5 to 13 when dependent on paragraph 4, wherein said measuring device comprises a camera.

15. An engine comprising a cylinder head with a sparkplug in each of multiple combustion chambers defined by the cylinder head, wherein the sparkplugs are consistently aligned with respect to respective fuel injector positions in each combustion chamber, wherein the threads in the cylinder head receiving the spark plugs have been formed by thread forging.

16. An engine as claimed in paragraph 15, wherein the threads have been formed by a method as claimed in any of claims 1 to 13.

17. A method of forming a thread on a workpiece substantially as described herein and with reference to the accompanying drawings.

18. A method of forming an engine cylinder head substantially as described herein and with reference to the accompanying drawings.

The present invention claims priority from UK patent application no. GB1320640.4, the entire contents of which are incorporated herein by reference.

The invention claimed is:

1. A method of producing a thread on a workpiece comprising the steps of:

providing a CNC machining center with a tool holder movable in an x, y, z co-ordinate space and rotatable about the z-axis, wherein the tool holder has a CNC datum face and a reference position of the datum face in said x, y, z space and about said z-axis;

providing a tapping tool having a thread-producing tip with a thread of pitch P between adjacent turns of the thread, a tool axis and a tool datum face remote from the tip, the tool being fixable in said tool holder with the tool datum face in fixed axial and angular relation to the CNC datum face, and with the tool axis coincident with said z-axis;

disposing said tool in a tool presetter;

in the tool presetter, measuring a length L of the tool along the tool axis between the tool datum face and a distal end of the thread-producing tip;

in the tool presetter, measuring in a first plane containing the tool axis a distance D' between a complete thread-producing peak and the tool datum face, wherein the thread-producing peak is the $n^{th}$ turn of the thread from the tip distal end of the tool;

determining from the distance D' a corresponding distance D in a zero plane containing a reference position when the tool is in the tool holder of the CNC machining center, based on a relation $D=D'\pm\beta P/360$, where β is an angle between said first and zero planes;

defining a spot face surface on the workpiece at which a thread, to be produced, is to commence at a predetermined start angle with respect to the thread axis;

fitting the tool in the tool holder of the CNC machining center and positioning the datum face of the tool holder at a start position a distance A from the spot face and an angle α degrees between the reference position of the datum face and the start angle, where $$A=L+\alpha P/360+c+(L-D-(n-0.5)P)$$

where c is a constant equal to an integer multiple of the pitch P; and driving and rotating the tool and tool holder from the start position toward the workpiece at an axial rate of P per revolution of the tool until the thread is produced.

2. A method as claimed in claim 1, in which one or both of a and c are zero.

3. A method as claimed in claim 1, in which n is between 4 and 7.

4. A method as claimed in claim 1, in which the distances L and D are determined using a measuring device.

5. A method as claimed in claim 4, in which the tapping tool comprises points and flats of a thread-forming thread around its circumference and the tool is rotated around a measured offset angle in the presetter until a point of the peak of the $n^{th}$ thread-forming thread aligns with a measuring plane of the measuring device before measuring the distance D', said plane containing the tool axis.

6. A method as claimed claim 1, in which the workpiece comprises an internal bore.

7. A method as claimed in claim 6, in which the internal bore is an internal bore of an engine cylinder head.

8. A method as claimed in claim 7, in which the bore is configured to receive a spark plug.

9. A method as claimed in claim 8, in which the internal bore is drilled from a fire surface of the cylinder head, whereby a chamfer can be formed on the fire surface leading to an area where spark plug electrodes will be seated.

10. A method as claimed in claim 7, wherein the spot face is milled from a cover surface of the cylinder head.

11. A method as claimed in claim 7, in which the tapping tool is provided with a tool shaft between its holder and the thread producing peaks that is at least three times the diameter of the shaft whereby the shaft provides flexibility which corrects any misalignment between the tapping tool and the bore.

12. A method as claimed in claim 1, wherein the tapping tool is a thread-forming tool and the method is a method of forming a thread.

13. A method of arranging the position of a spark plug at a predetermined angular position in a cylinder head of an internal combustion engine, the method comprising:
providing spark plugs with predetermined angular positions of ground electrodes with respect to a thread employed to secure the spark plug in the cylinder head;
forming a bore in an engine cylinder head to respectively receive said spark plugs, the bore having a thread with a predetermined start position, forming the bore by:
providing a CNC machining center having a tool holder for tools;
using a milling tool in the CNC machine, milling a spot face around the bore from a cover side of the cylinder head;
changing the tool in the CNC machine to a tapping tool for which a quantity (L−D−(n−0.5)P) has previously been determined from measurements made of the tool, where L is the length of the tool from its tip to a datum face, which datum face is adapted to engage with a corresponding datum face in a CNC machine, D is a length of the tool from an $n^{th}$ thread, counted from the tip, to the datum face in a plane containing a longitudinal axis of the tool and a zero reference position of the tool employed by the CNC machine, and P is the pitch of the thread;
positioning the tool holder at a start position with the datum face at a distance A from the spot face and angle α degrees between the zero reference position and the start angle, where A=L+αP/360+c+(L−D−(n−0.5)P) where P is the pitch of the thread and c is a constant equal to an integer multiple of the pitch P; and
driving and rotating the tool and tool holder from the start position toward the workpiece at an axial rate of P per revolution of the tool until the thread is produced.

14. A method as claimed in claim 13, in which the bore in the cylinder head is produced by:
drilling a bore in the cylinder head from a fire side of the cylinder head; and
turning the cylinder head in the CNC machine to permit access to the cover side by said milling tool and tapping tool.

15. A method as claimed in claim 13, wherein the tapping tool is a thread-forming tool.

16. A method as claimed in claim 13, wherein L and D are determined using a measuring device comprising a camera.

17. A method, comprising:
manufacturing an engine including producing a thread in an internal bore of a cylinder head of the engine by
providing a CNC machining center with a tool holder movable in an x, y, z co-ordinate space and rotatable about the z-axis, wherein the tool holder has a CNC datum face and a reference position of the datum face in said x, y, z space and about said z-axis;
providing a tapping tool having a thread-producing tip with a thread of pitch P between adjacent turns of the thread, a tool axis and a tool datum face remote from the tip, the tool being fixable in said tool holder with the tool datum face in fixed axial and angular relation to the CNC datum face, and with the tool axis coincident with said z-axis;
disposing said tool in a tool presetter;
in the tool presetter, measuring a length L of the tool along the tool axis between the tool datum face and a distal end of the thread-producing tip;
in the tool presetter, measuring in a first plane containing the tool axis a distance D' between a complete thread-producing peak and the tool datum face, wherein the thread-producing peak is the $n^{th}$ turn of the thread from the tip distal end of the tool;
determining from the distance D' a corresponding distance D in a zero plane containing a reference position when the tool is in the tool holder of the CNC machining center, based on a relation D=D'±βP/360, where β is an angle between said first and zero planes;
defining a spot face surface on the workpiece at which a thread, to be produced, is to commence at a predetermined start angle with respect to the thread axis;
fitting the tool in the tool holder of the CNC machining center and positioning the datum face of the tool holder at a start position a distance A from the spot face and an angle α degrees between the reference position of the datum face and the start angle, where $$A=L+\alpha P/360+c+(L-D-(n-0.5)P)$$

where c is a constant equal to an integer multiple of the pitch P; and
driving and rotating the tool and tool holder from the start position toward the workpiece at an axial rate of P per revolution of the tool until the thread is produced.

18. The method of claim 17, comprising manufacturing a vehicle including manufacturing the engine as claimed in claim 17.

19. A non-transitory computer-readable storage medium containing a plurality of instructions that are executable by a CNC machining center, the CNC machining center including:
a tool holder movable in an x, y, z co-ordinate space and rotatable about the z-axis, wherein the tool holder has a CNC datum face and a reference position of the datum face in said x, y, z space and about said z-axis;
a tapping tool having a thread-producing tip with a thread of pitch P between adjacent turns of the thread, a tool axis and a tool datum face remote from the tip, the tool being fixable in said tool holder with the tool datum face in fixed axial and angular relation to the CNC datum face, and with the tool axis coincident with said z-axis;
the instructions being for:
with the tool in a tool presetter, measuring a length L of the tool along the tool axis between the tool datum face and a distal end of the thread-producing tip;
in the tool presetter, measuring in a first plane containing the tool axis a distance D' between a complete thread-producing peak and the tool datum face, wherein the thread-producing peak is the $n^{th}$ turn of the thread from the tip distal end of the tool;
determining from the distance D' a corresponding distance D in a zero plane containing a reference position when the tool is in the tool holder of the CNC machining center, based on a relation D=D'±βP/360, where β is an angle between said first and zero planes;
defining a spot face surface on the workpiece at which a thread, to be produced, is to commence at a predetermined start angle with respect to the thread axis;

fitting the tool in the tool holder of the CNC machining center and positioning the datum face of the tool holder at a start position a distance A from the spot face and an angle α degrees between the reference position of the datum face and the start angle, where $$A = L + \alpha P/360 + c + (L - D - (n - 0.5)P)$$

where c is a constant equal to an integer multiple of the pitch P; and driving and rotating the tool and tool holder from the start position toward the workpiece at an axial rate of P per revolution of the tool until the thread is produced.

* * * * *

UNITED STATES PATENT AND TRADEMARK OFFICE
CERTIFICATE OF CORRECTION

PATENT NO. : 9,956,628 B2  
APPLICATION NO. : 15/038048  
DATED : May 1, 2018  
INVENTOR(S) : Ben Onley and Stephen Yeoman

Page 1 of 1

It is certified that error appears in the above-identified patent and that said Letters Patent is hereby corrected as shown below:

In the Claims

In Claim 2, Column 16, Line 41; replace "of a and c" with --of α and c--

Signed and Sealed this  
Twenty-second Day of October, 2019

Andrei Iancu  
*Director of the United States Patent and Trademark Office*